(No Model.)
E. R. DE WOLFE.
INFLATABLE RUBBER TIRE FOR BICYCLES.
No. 466,556. Patented Jan. 5, 1892.
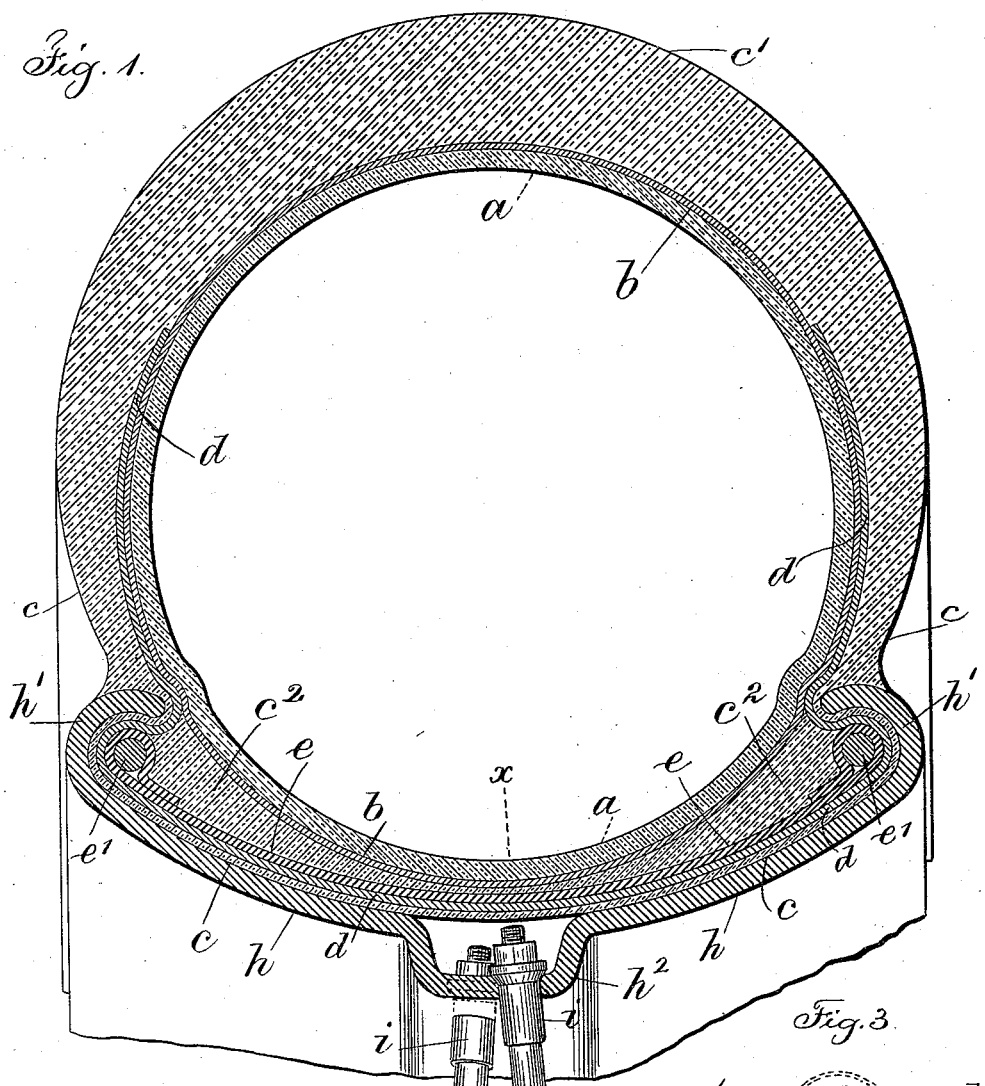
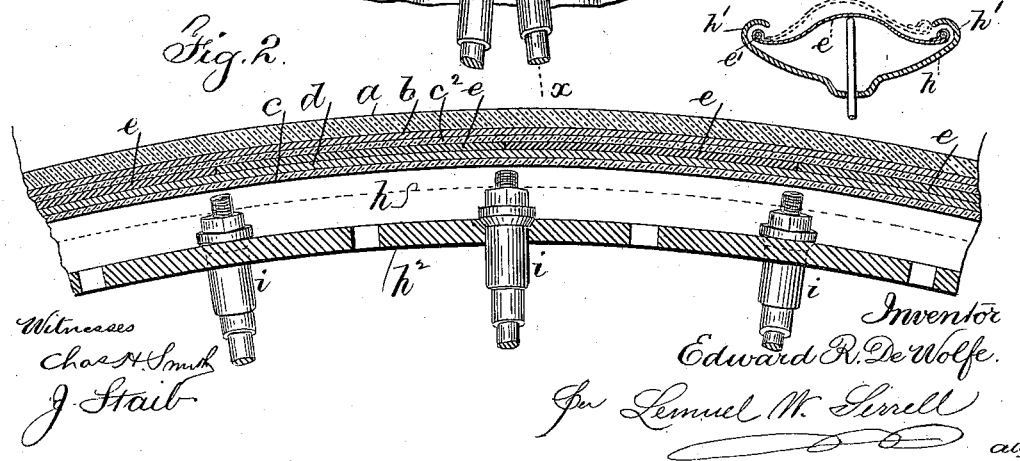

UNITED STATES PATENT OFFICE.

EDWARD R. DE WOLFE, OF NEW YORK, N. Y., ASSIGNOR TO HIMSELF AND GEORGE R. BIDWELL, OF SAME PLACE.

INFLATABLE RUBBER TIRE FOR BICYCLES.

SPECIFICATION forming part of Letters Patent No. 466,556, dated January 5, 1892.

Application filed August 10, 1891. Serial No. 402,228. (No model.)

*To all whom it may concern:*

Be it known that I, EDWARD R. DE WOLFE, a citizen of the United States, residing in the city, county, and State of New York, have invented a new and useful Improvement in Inflatable Rubber Tires for Bicycles and other Vehicles, of which the following is a specification.

My invention relates to that class of rubber tires for bicycles and other vehicles known as "pneumatic" or "inflatable" tires, the same being filled with air under pressure and the pressure sustained by an air-valve, but being releasable; and its object is to so construct the pneumatic or inflatable tire that the same can be readily removed from or inserted into the tire or felly of the wheel, because heretofore in tires of this character it was generally difficult to remove the tire from the rim or separate it therefrom without injury.

My invention consists in a pneumatic or inflatable rubber and fabric tire of peculiar construction and a metal felly to which the same is removably secured.

My improved tire consists of a complete inner rubber tube, around which is an inclosing sleeve of fabric, such as canvas, and outside of this a tubular rubber covering with a thickened tread, in the base of which outside covering I mold plates of thin spring metal having beaded wire edges, and I employ a rim or felly with inwardly-curved edges, into which the said tire and its plates of metal are sprung and fit, the same being held in place mainly by the inflation of the tire, but from which felly said tire with its spring-plates can be readily removed after the air has been let out, in order that the wheel may be repaired.

In the drawings, Figure 1 is a cross-section of my improved inflatable tire and the rim of the wheel to which it is adapted. Fig. 2 is a partial longitudinal section at $x\ x$ of Fig. 1. Fig. 3 is a view illustrative of the manner of removing the tire from the rim. Figs. 1 and 2 are shown of exaggerated size.

$a$ represents the complete inner rubber tube, and $b$ the inclosing sleeve, of woven or knitted fabric, which surrounds the same. This sleeve $b$ may be complete and seamless, or it may be formed from a strip of canvas webbing cut on the bias, the edges being sewed or otherwise connected to form the sleeve.

$c$ represents the outer tubular rubber covering with a thickened tread at $c'$ and a filling of rubber at $c^2$.

$d$ represents a strip of fabric, such as canvas, molded into the tire in the manner shown, and hereinafter more particularly described.

$e$ represents plates of thin spring metal of slightly concave form, in general contour conforming with the internal shape of the rim or felly $h$. The respective edges of these plates $e$ are bent over or beaded and may contain wires $e'$, the parts at these places being preferably soldered together to firmly secure the wire and the edge of the metal together. The rim or felly $h$ has curved edges at $h'$ and a ribbed center $h^2$ for the spoke-nipples $i$.

My improved tire is molded upon a rim or form slightly smaller circumferentially than the rim of the wheel and conforming in contour therewith, and the manner of building up the tire is substantially as follows: The inside of the form and its edges are surfaced with rubber, and the plates of metal $e$, with the strips of fabric $d$ around them, are inserted into the mold, after which the filling of rubber $c^2$ is laid in the mold over the plates of metal. The inner rubber tube $a$ and its inclosing sleeve $b$ are now formed and placed in the mold and the edges of the strips of fabric $d$ are laid up against the sleeve $b$ and cemented thereto. The rubber covering $c$ and its thickened tread $c'$ are now formed over the sleeve $b$ and ends of the strip $d$, with the edge or thickened portion of the base resting upon the curved edges $h'$ of the rim, and the rubber covering here unites with the edges of the thin surface of rubber within the mold or form. During this operation the fabric, both of the sleeve $b$ and strips $d$, is saturated with rubber, and the complete hollow inflatable tire is now to be vulcanized on the form into a unitary mass wherein the parts are all united together. After vulcanizing, the tire is removed from the form complete and endless and is ready to be placed upon and connected to the felly of a wheel. This is done before the tire is inflated with air, the metal plates $e$ being bowed inwardly, as shown in Fig. 3, as the tire is sprung into the rim, and after the tire is in place these plates are bent into the form shown in Fig. 1 by a downward pressure upon the outer surface of the tire. This will bring the beaded or wired edges of the plates beneath the curved edges of the rim, and when the tire is inflated with air the pressure will act to completely and securely seat the plates and hold the tire to the rim. It will be seen from the section, Fig. 2, that the plates of thin spring metal $e$ are quite narrow, their width being about equal to the distance between the centers of the respective spokes, and a large number of said plates are consequently employed in each tire to extend around its circumference, these plates not interfering with springing the tire progressively into the rim.

To remove the tire from the rim, the air is allowed to escape through any suitable air-valve that may be employed and a small rod is employed for bending the various plates $e$ in succession into the position shown in Fig. 3, and this is accomplished by inserting the rod through holes provided in the rim, preferably equidistant between the spokes and at approximately the center of each of said plates, and after said plates are thus bent the tire and plates can be readily compressed further by sidewise hand pressure, as shown by dotted lines, Fig. 3, and the tire be progressively pulled out of the rim intact and without being injured, and can be again reinserted into the rim, as heretofore described.

I claim as my invention—

1. The tubular inflatable rubber tire having permanently connected therewith thin metallic plates adapted to be sprung in between the inwardly-curved edges of the wheel-felly for holding such rubber tire in place, substantially as specified.

2. The combination, with the rubber and fabric portions forming an inflatable tire, of plates of thin metal having beaded or wired edges to stiffen the same and molded into the rubber at the base of said tire, substantially as and for the purposes set forth.

3. The combination, with a metal rim or felly having inwardly-curved edges and central holes, of an inflatable tire composed of rubber and fabric portions, and plates of metal with beaded or wired edges molded into the rubber of said tire and adapted to be sprung into and held within the curved edges of said rim or felly, substantially as set forth.

4. The combination, with the inner rubber tube $a$ and fabric sleeve $b$, of the thin metal plates $e$, with stiffened edges, the fabric strips $d$, passing around the plates $e$ and adjacent to the sleeve $b$, and an outer covering of rubber $c$ encircling the other portions, substantially as and for the purposes set forth.

5. The combination, with the inner rubber tube $a$ and fabric sleeve $b$, of the thin metal plates $e$, with wired stiffened edges $e'$, the filling rubber $c^2$, the fabric strips $d$, passing around the plates $e$ and adjacent to the sleeve $b$, and an outer covering of rubber $c$ with a thickened tread $c'$, forming the complete outer covering of the tire, said parts being all vulcanized together into a unitary mass, substantially as and for the purposes set forth.

Signed by me this 6th day of August, A. D. 1891.

E. R. DE WOLFE.

Witnesses:
GEO. T. PINCKNEY,
HAROLD SERRELL.